United States Patent [19]
Etienne et al.

[11] Patent Number: 5,581,493
[45] Date of Patent: Dec. 3, 1996

[54] DEVICE FOR FILTERING POSITIVE DEJUSTIFICATION JITTER OF A DIGITAL BIT STREAM AND APPLICATION THEREOF TO FILTERING POSITIVE AND POSITIVE-NEGATIVE DEJUSTIFICATION JITTER OF A DIGITAL BIT STREAM

[75] Inventors: Jean-Paul Etienne, St Quay-Perros; Jean-Louis Jeandot, Limours, both of France

[73] Assignee: Alcatel CIT, Paris, France

[21] Appl. No.: 303,945

[22] Filed: Sep. 9, 1994

[30] Foreign Application Priority Data

Sep. 10, 1993 [FR] France ................................. 93 10822
Oct. 20, 1993 [FR] France ................................. 93 12496

[51] Int. Cl.⁶ ..................................................... G06F 15/31
[52] U.S. Cl. ........................................................ 364/724.01
[58] Field of Search ...................... 360/10.1; 364/724.01; 370/102

[56] References Cited

U.S. PATENT DOCUMENTS 5,253,118 10/1993 Konno ..................................... 360/10.1
5,343,476 8/1994 Urbansky ................................ 370/102
5,410,499 4/1995 Waters ............................... 364/724.01

FOREIGN PATENT DOCUMENTS

0473338A2  3/1992  European Pat. Off. .
0481847A1  4/1992  European Pat. Off. .
WO9316536  8/1993  WIPO .

*Primary Examiner*—Tan V. Mai
*Attorney, Agent, or Firm*—Sughrue, Mion, Zinn, Macpeak & Seas

[57] ABSTRACT

A device for filtering positive dejustification jitter of a digital bit stream includes a phase-locked loop for slaving the timing of a signal representative of the read timing of a buffer memory into which the dejustified digital bit stream is written to the timing of a signal representative of the write timing of the buffer memory. The device applies low-pass filtering and determines the actual justification rate of the digital bit stream and deduces therefrom the difference justification rate, i.e. the difference between the actual rate and a nominal justification rate of the digital bit stream. It systematically eliminates phase shifts due to positive dejustification from the signal representative of the buffer memory write timing, regenerates phase shifts of the signal in numbers corresponding to the nominal justification rate, and regenerates phase shifts of the signal in numbers corresponding to the difference justification rate and smooths the phase shifts.

17 Claims, 7 Drawing Sheets

DEVICE FOR FILTERING POSITIVE DEJUSTIFICATION JITTER OF A DIGITAL BIT STREAM AND APPLICATION THEREOF TO FILTERING POSITIVE AND POSITIVE-NEGATIVE DEJUSTIFICATION JITTER OF A DIGITAL BIT STREAM

BACKGROUND OF THE INVENTION

1. Field of the Invention

The present invention is generally concerned with digital transmission.

The present invention is more particularly concerned with filtering dejustification jitter of a digital bit stream, i.e. the jitter caused by eliminating from the received bit stream justification bits inserted during its formation for matching the timing of an unjustified digital bit stream to be transmitted to the timing at which it is to be transmitted.

The present invention is more particularly applicable to digital bit streams formed using the positive justification technique which is used if the timing of the unjustified digital bit stream to be transmitted has a lower nominal value than the timing with which it is to be transmitted.

The present invention is therefore applicable to timing adaptation in a plesiochronous transmission network.

The invention is therefore also applicable to timing adaptation at the input of a synchronous transmission network and in particular of a synchronous transmission network transmitting digital bit streams formed in accordance with the synchronous multiplexing hierarchy defined in CCITT Recommendations G.707, G.708 and G.709.

2. Description of the Prior Art

The timing of an unjustified digital bit stream can be recovered at the receiving end from a positive justified digital bit stream after eliminating the justification bits from the latter. A known method for this uses a phase-locked loop to slave the rate at which a buffer memory is read to the rate at which the buffer memory is written by the incoming digital bit stream, after elimination of its justification bits. This method uses low-pass filtering.

The problem arises that the jitter due to positive dejustification includes very low frequency components which cannot be eliminated by this method.

The present invention can provide a solution to this problem.

SUMMARY OF THE INVENTION

The present invention consists in a device for filtering positive dejustification jitter of a digital bit stream, said device including a phase-locked loop for slaving the timing of a signal representative of the read timing of a buffer memory into which said dejustified digital bit stream is written to the timing of a signal representative of the write timing of said buffer memory, whilst applying low-pass filtering, which device further comprises first means for determining the actual justification rate of said digital bit stream and for deducing therefrom the difference justification rate Td i.e. the difference between said actual rate and a nominal justification rate Tn of said digital bit stream, and second means for:

systematically eliminating phase shifts due to positive dejustification from said signal representative of said buffer memory write timing,

2 regenerating phase shifts of said signal in numbers corresponding to said nominal justification rate, and regenerating phase shifts of said signal in numbers corresponding to said difference justification rate and with smoothing of said phase shifts.

The present invention also consists in the application of a device of the above kind to filtering the dejustification jitter of a digital bit stream formed using positive justification and positive-negative justification at different levels and in particular to filtering the dejustification jitter of a digital bit stream transmitted through a synchronous transmission network and formed using these two justification techniques, the first at the network input and the second within the network.

Other objects and features of the present invention emerge from the following description of embodiments of the invention given with reference to the appended drawings.

DESCRIPTION OF THE PREFERRED EMBODIMENTS

Figure 1:
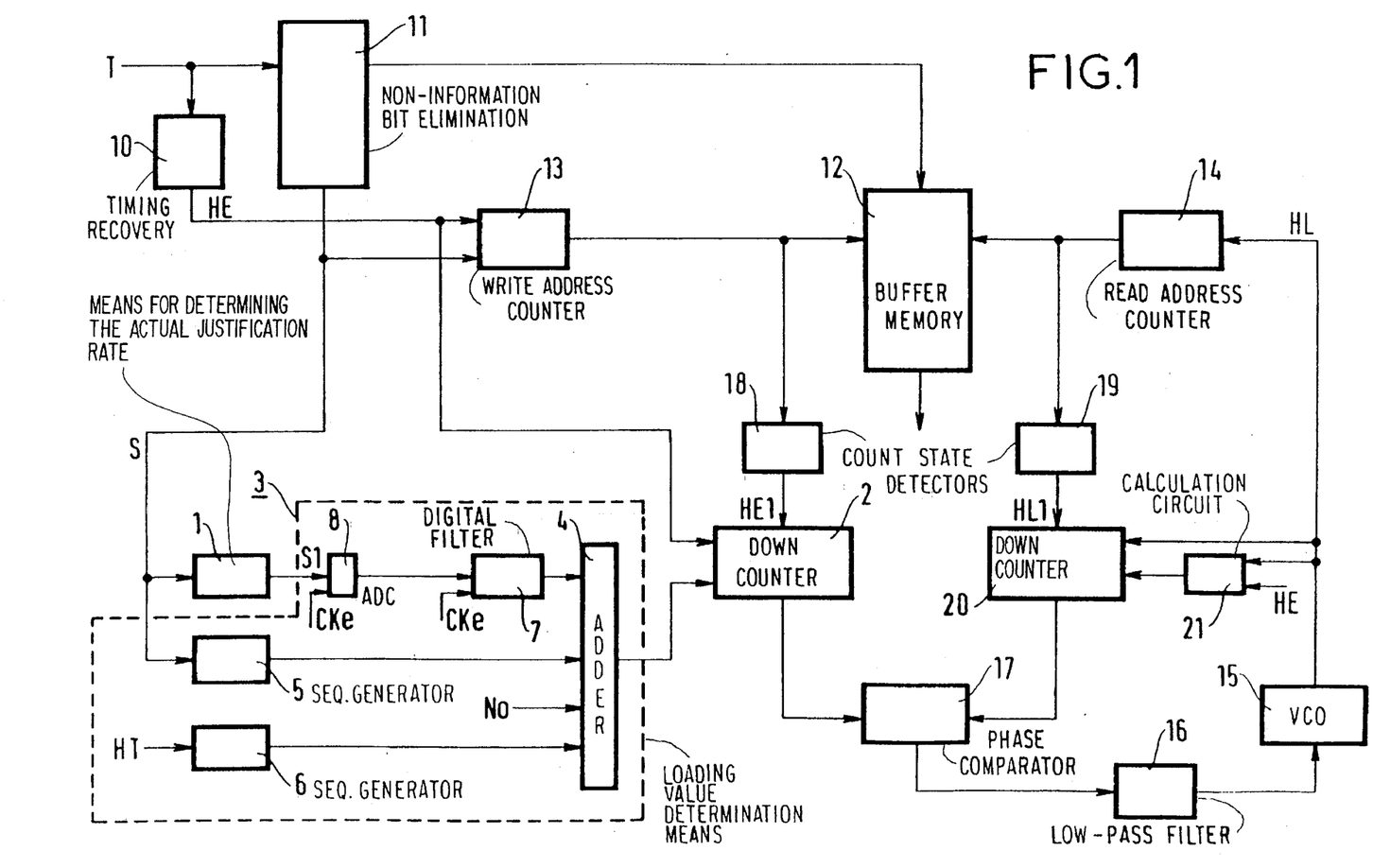
FIG. 1 is a block diagram of a device of the present invention.

The device shown is FIG. 1 is adapted to filter the positive dejustification jitter of an incident digital bit stream T.

In the positive justification technique some information bit locations carry justification (or stuffing) bits, these locations being indicated by positive justification indication bits.

The incoming digital bit stream is first processed, using known methods which need not be described here, to:

extract a timing signal HE giving the input timing, using a circuit 10, eliminate bits other than information bits, especially justification bits and justification indication bits, using a circuit 11.

In a manner that is also known in itself, the information bits are written into a buffer memory 12 at addresses supplied by a write addressing counter 13 which is incremented by the timing signal HE only when enabled by a positive justification indication signal S from the circuit 11 formed from said positive justification indication bits.

In a manner that is also known in itself the information bits are read out from the buffer memory 12 at addresses supplied by a read address encounter 14 incremented by a timing signal HL obtained from a phase-locked loop.

In a manner that is also known in itself this phase-locked loop includes a controllable oscillator 15 supplying the timing signal HL and controlled by the output signal of a low-pass filter 16 receiving the output signal of a phase comparator 17 giving the phase difference between signals representative of the buffer memory write and read timing.

The device shown in FIG. 1 further includes a count state detector 18 and a count state detector 19 for detecting predetermined count states of the write addressing counter 13 and the read addressing counter 14, these detectors advantageously detecting only one such state per buffer memory addressing cycle (in order to avoid application of multiple phase shifts to the phase-locked loop during the same buffer memory addressing cycle). These count state detectors supply said signals representative of the write and read timing. These signals, HE1 and HL1, respectively, include pulses at times when said write addressing and read addressing counters pass through said predetermined count states.

The device shown in FIG. 1 further comprises means 1 for determining the actual justification rate of the incoming digital bit stream and deducing therefrom the difference justification rate Td, i.e. the difference between the actual justification rate and a nominal justification rate Tn.

One embodiment of the means 1 is shown for the application of the invention to filtering the positive dejustification jitter due to elimination of justification bits inserted at the input to a 140 Mbit/s plesiochronous tributary in a synchronous transmission network on which digital bit streams are transmitted at 155 Mbit/s as defined in CCITT Recommendations G.707, G.708 and G.709.

A frame STM1 transmitted at 155 Mbit/s in a network of this kind comprises nine rows each of which includes a justification opportunity for the 140 Mbit/s tributary.

In this application the nominal justification rate Tn is 7/9 and each row includes, in addition to a location reserved for a justification bit, a location reserved for a justification indication bit. This indicates whether the location reserved for a justification bit is occupied by a justification bit (if the justification opportunity is used) or by an information bit (otherwise).

The means 1 can then comprise a downcounter loaded with the value 7 at the start of each frame and decremented by the positive justification indication signal S which includes a pulse each time that the justification indication bit indicates that the justification opportunity has been used.

At the end of each frame the state of this downcounter is therefore equal to the difference between the actual justification rate and the nominal justification rate.

The device shown in FIG. 1 further comprises means 2, 3 for:

systematically eliminating phase shifts due to positive dejustification in said signal representative of the buffer memory write timing, regenerating phase shifts of this signal in numbers corresponding to said nominal justification rate, regenerating phase shifts of this signal in numbers corresponding to said justification difference rate and smoothing these phase shifts.

In the example shown in FIG. 1 the means 2, 3 include:

a down counter for applying to said signal representative of the buffer memory write timing a time-delay obtained by superposing:

a sequence of values $-N$ where N is a positive number denoting the amplitude of said phase shifts, the values of this sequence being generated so that they are applied coincidentally with the pulses of said signal which are affected by these phase shifts, a sequence of values $+N$, there being $Tn \cdot A$ such values per period $1/F$, where F denotes the frequency at which said real justification and difference justification rates are determined and A denotes the maximum number of phase shifts in a period $1/F$, sequences of values varying progressively from 0 to $Td \cdot A \cdot N$ (with Td positive or negative), each of these sequences being generated when a non-null difference justification rate is determined, a nominal value No determined in such a way that the value resulting from said superposition does not become negative in the case of consecutive negative values Td, means for applying to the pulses of said signal representative of the buffer memory read timing a constant time-delay Mo such that $Mo \times TL = No \times TE$ where TL and TE respectively denote the period of the buffer memory read timing signal and the period of the buffer memory write timing signal.

The downcounter 2 counts down from loading values supplied by means 3 for determining these loading values, said downcounting being initiated by the pulses of the signal HE1 and being timed by the signal HE.

The means 3 for determining said loading values include an adder 4 which receives:

at a first input a sequence of values $-1$ (in this instance N=1) generated by a generator 5 controlled by the positive justification indication signal S, the values of this sequence being generated in such a way that they are applied coincidentally with the pulses of the signals HE1 which are affected by the phase shifts due to positive justification, at a second input a sequence of values $+1$ generated by a generator 6 controlled by a timing signal HT giving the timing of the STM1 frames, there being seven values in this sequence per STM1 frame period, at a third input sequences of values varying progressively from 0 to $Td \times 9$, with Td positive or negative, generated by a digital filter 7, each of these sequences being generated each time that a non-null difference justification rate Td is determined, at a fourth input said nominal value No.

If the same signal S is applied to the write addressing counter 13 and to the generator 5, so that the values of the sequence generated by the generator 5 are applied coincidentally with the pulses of the signal HE1 which are affected by the phase shifts due to positive dejustification, application of the signal S to the write addressing counter 13 is delayed relative to application of this same signal to the generator 5.

Figure 2A:
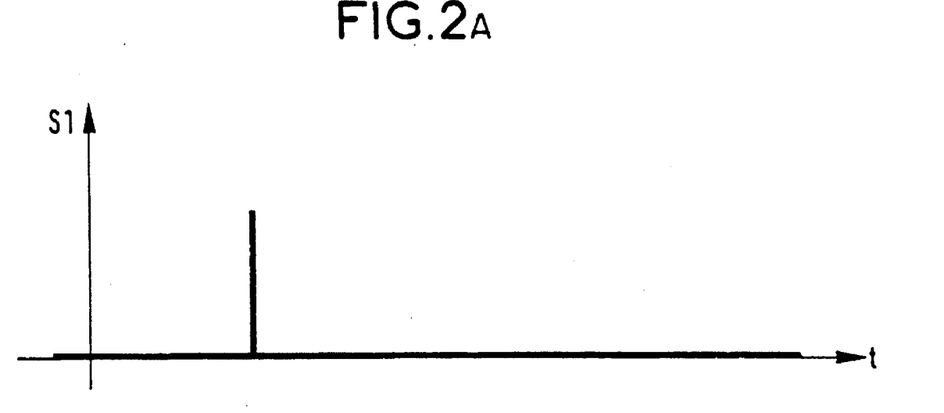
FIGS. 2A and 2B are diagrams illustrating the operation of the device shown in FIG. 1.

The digital filter 7 receives a difference justification rate indication signal S1, as shown in FIG. 2A from the means 1 via an analog-digital converter 8.

This difference justification rate indication signal can, for example, comprise two pulse signals of which one includes a pulse each time that a positive difference justification rate is determined and the other includes a pulse each time that a negative justification rate is determined.

Figure 2B:
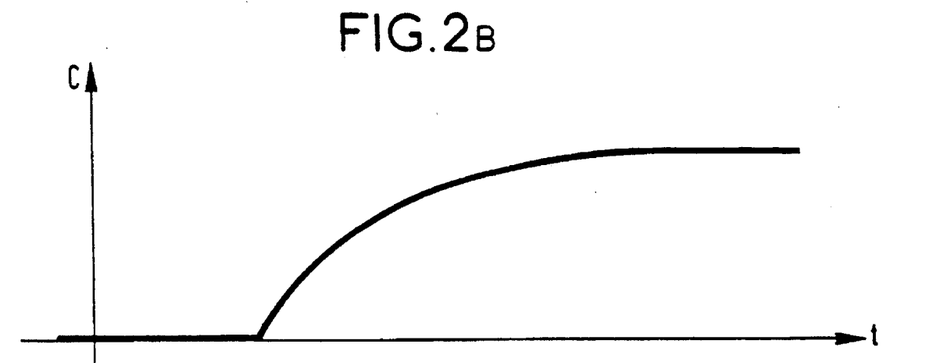

In response to this pulse the digital filter 7 supplies a series of values varying progressively from 0 to $Td \times 9$, for example varying exponentially in the case of a first order, in this instance low-pass filter, as shown in FIG. 2B in which the signal C is the analog signal corresponding to the digital signal obtained at the output of this filter.

The analog-digital converter 8 and the digital filter 7 also receive a sampling clock signal CKe at more than twice the maximum frequency of the pulses of the signal S1 and less than or equal to the nominal frequency of the signal HE1 (i.e. its frequency in the absence of any phase shifts).

Said nominal value No is determined, allowing for the bandwidth of the digital filter 7 and the maximum number of consecutive times a justification rate of negative sign can be obtained, so that the value resulting from said superposition does not become negative.

The downcounter 20 is triggered by the signal HL1, decremented by the timing signal HL and also receiving from a calculation circuit 21 the loading value Mo such that No×TE=Mo×TL where TE denotes the period of the timing signal HE and TL denotes the period of the timing signal HL, the circuit 21 consequentially receiving the signals HE and HL to produce this value Mo.

The signal from the downcounter 2 is one of the signals applied to the phase comparator 17.

The other signal applied to the phase comparator 17 is obtained at the output of the downcounter 20.

The combination of the downcounter 2 and the means 3 for fixing the loading value of the downcounter filters very low frequency components of the jitter due to positive dejustification of the incoming digital bit stream, the other, higher frequency components being eliminated in the conventional way by the low-pass filter 16 of the phase-locked loop.

An application of the device of the present invention to filtering the dejustification jitter of a digital bit stream using positive and positive-negative justification at different levels in its formation is described next with reference to FIG. 3.

Figure 3:
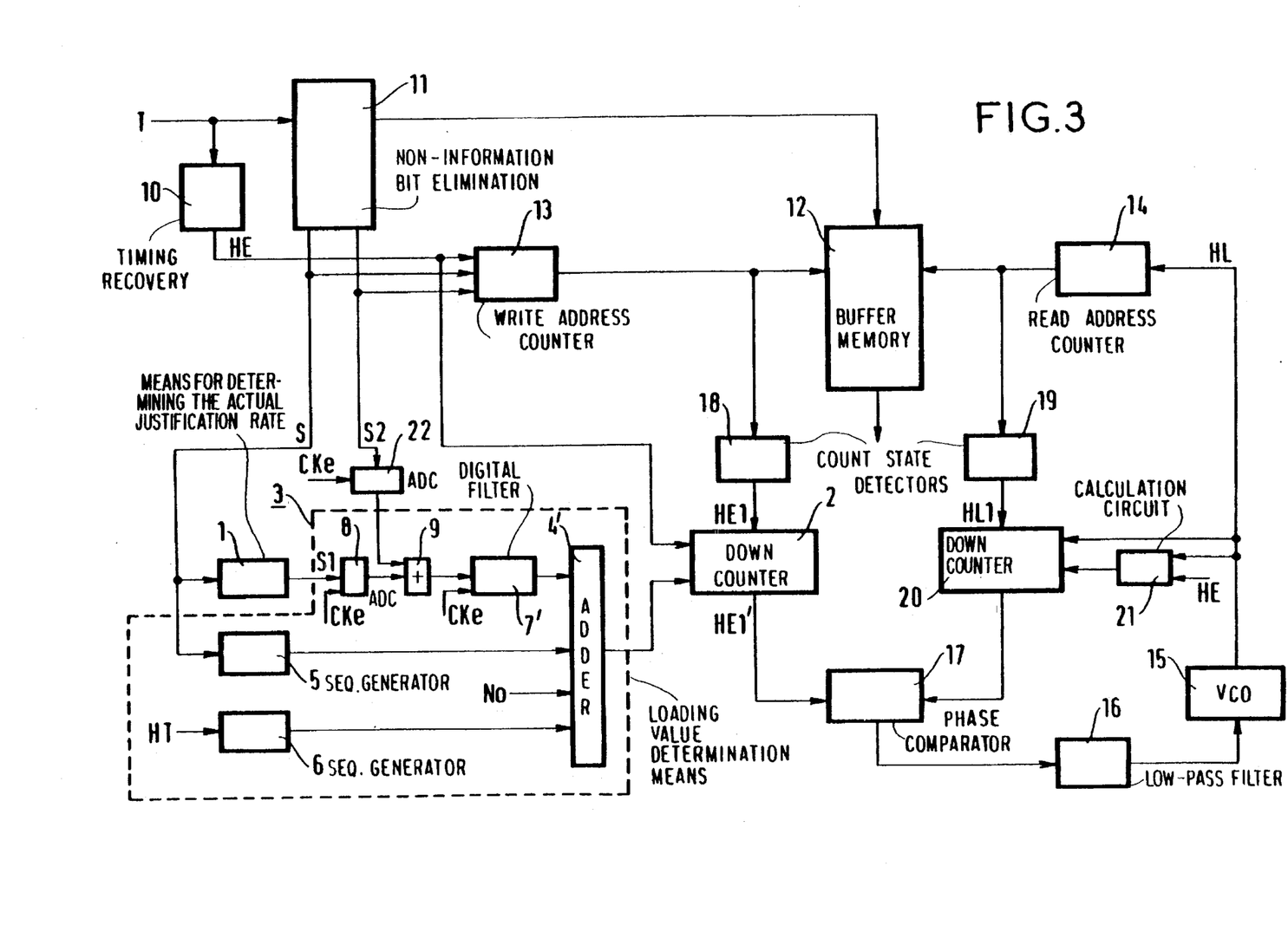
FIG. 3 is a diagram illustrating the application of the device of the present invention to filtering the dejustification jitter of a digital bit stream formed using positive and positive-negative justification at different levels.

The device shown in FIG. 3 differs from that shown in FIG. 1 in that it further includes:

time-delay means for applying to the pulses of the signal HE1 a time-delay which, in the presence of a phase shift due to positive-negative dejustification, becomes instantaneously, for the pulse of the signal HE1 affected by this phase shift, equal to +N' or to −N' according to whether said phase shift has an amplitude equal to −N' or an amplitude equal to +N', where N' denotes a positive number, and then, for a subsequent set of pulses, varies progressively from +N' to 0 or from −N' to 0, respectively, means controlled by a positive-negative justification indication signal S2 to determine the time-delay values to be applied to these time-delay means.

In the embodiment shown in FIG. 3 the time-delay means comprise the same down counter 2 as in FIG. 1 and the means 3 for determining said time-delay values include a digital filter 7' which receives via an analog-digital converter 22 said positive-negative justification indication signal S2 which comprises, for example in the case of a digital bit stream formed in accordance with the synchronous multiplexing hierarchy as defined in CCITT Recommendations G.707, G.708 and G.709, a pointer adjustment indication signal.

Figure 4A:
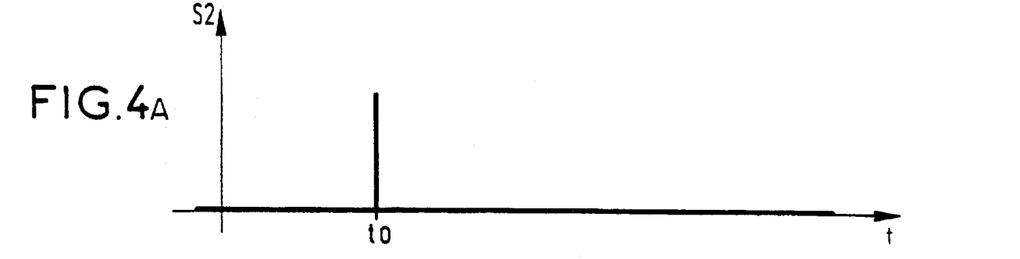
FIGS. 4A–4D are diagrams to illustrate the operation of the device shown in FIG. 3.

FIG. 4A shows one possible waveform of the signal S2 indicating phase shifts due to positive-negative dejustification.

In this example the signal S2 has pulses at the times, such as the time t0, for which a phase shift occurs and can in practise comprise two such signals, one having pulses for positive phase shifts and the other having pulses for negative phase shifts.

Figure 4B:
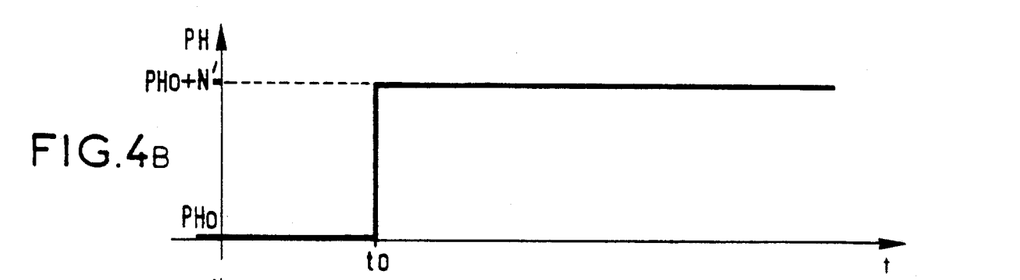

FIG. 4B also shows a signal PH indicating the phase of the timing signal HE1. The signal PH has a step waveform. The step values change, in the case of positive-negative dejustification, at the time such as the time t0 mentioned above. By way of example, FIG. 4 shows the case of a phase shift of amplitude equal to +N', changing the phase of the signal PH from a value PHo (before time t0) to a value PHo+N' (after time t0).

Figure 4C:
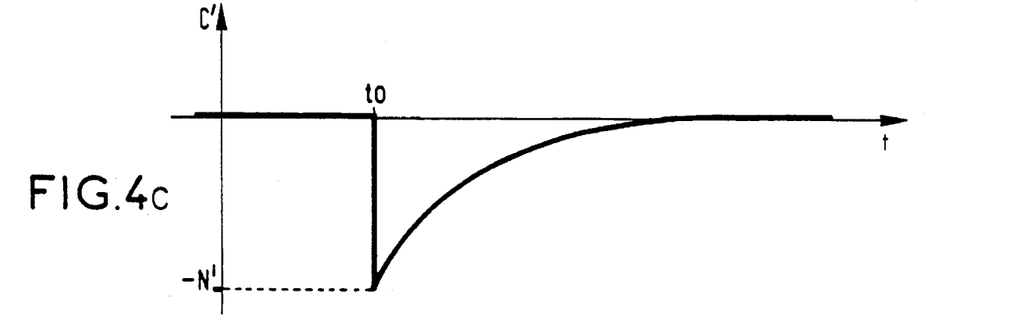

FIG. 4C also shows a signal C' consisting of the analog signal corresponding to the digital signal obtained in the case of positive-negative dejustification only at the output of the digital filter 7', for the example in which this filter is a first order filter, and more particularly for the example under consideration here in which the signal S2 is a pulse signal, a first order low-pass filter. If the signal S2 were a step signal, it would be a high-pass filter.

The transfer function of the digital filter 7' is determined so that at a time such as the time t0 at which a phase shift occurs the digital filter 7' supplies a value equal to −N' in the case (as specifically shown in FIG. 4C) of a phase shift of amplitude equal to +N', or a value equal to +N' in the case of a phase shift of amplitude equal to −N'.

Figure 4D:
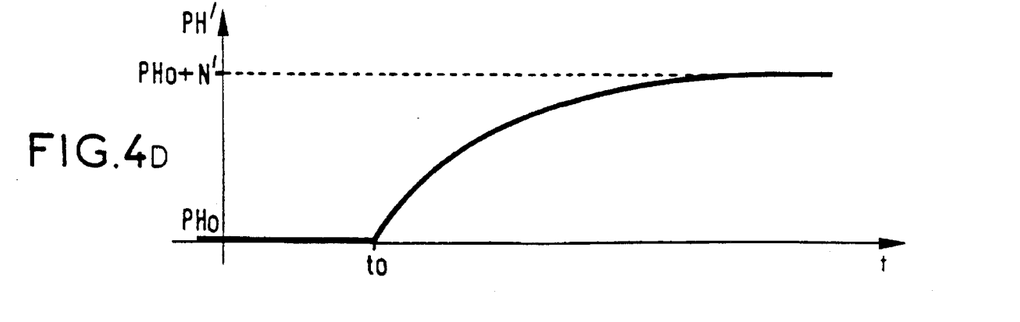

In these circumstances the pulse of the timing signal HE1' obtained at the output of the downcounter 2 corresponding to the pulse of the timing signal HE1 which is affected by the phase shift in question is not affected by this phase shift, as shown in FIG. 4D where it can be seen that the phase PH' of the timing signal HE1' is not subject to any discontinuity at time t0.

The phase shift eliminated in this way is then regenerated progressively. The transfer function of the digital filter 7' is further determined so that this digital filter supplies from time t0, and for example in the case of a phase shift of amplitude +N', a sequence N'i of values of the type −N'+n'i, with n'i positive, increasing with the numerical position i of the value in this sequence, so that these values tend towards the value 0, exponentially in the situation shown in FIG. 4D. The phase PH' of the timing signal HE1' then increases, also exponentially, towards the value PHo+N'.

In the example shown in FIG. 3 the digital filter 7' is also used to supply the sequences of values varying progressively from 0 to Td·A·N· generated each time that a non-null difference justification rate is determined. It is therefore necessary to provider the adder 4' with a fifth input to receive a sequence of values+Td×9 (more generally +Td·A·N·) generated each time that a non-null difference justification rate is determined, this fifth input of the adder 4' being connected for this purpose to the output of the means 1.

In this example the digital filter 7' then receives the signal from an adder 9 receiving via the analog-digital converter 8 the difference justification rate indication signal S1 and via the analog-digital converter 22 the positive-negative justification indication signal S2.

The analog-digital converters 8 and 22 and digital filter 7' further receive a sampling clock signal CKe whose frequency is greater than twice the maximal frequency at which pulses occur in the signals S1 and S2 and less than or equal to the nominal frequency of the timing signal HE1.

The digital filter 7' can be a conventional fixed bandwidth filter comprising two stages: a first stage constituting a first order low-pass filter and a second stage constituting a first order high-pass filter. The combination of the two stages then constitutes a low-pass filter. The filter 7' associated with the buffer memory 12 and with the phase comparator 17 carries out low-pass filtering which tends to eliminate the phase jitter. A conventional filter 7' is sufficient to eliminate the phase jitter in the 200 Hz to 3.5 MHz band for a fixed amplitude and for a fixed type of justification sequence. However, in some cases this filtering must be enhanced to eliminate very low frequency jitter, for example jitter at frequencies down to 0.05 Hz. The use of a narrow bandwidth filter 7' enhances filtering of very low frequency phase jitter but increases the risk of saturation of the buffer memory because the dejustification device reacts more slowly to a transient, i.e. at the start of each justification sequence.

Figure 5:
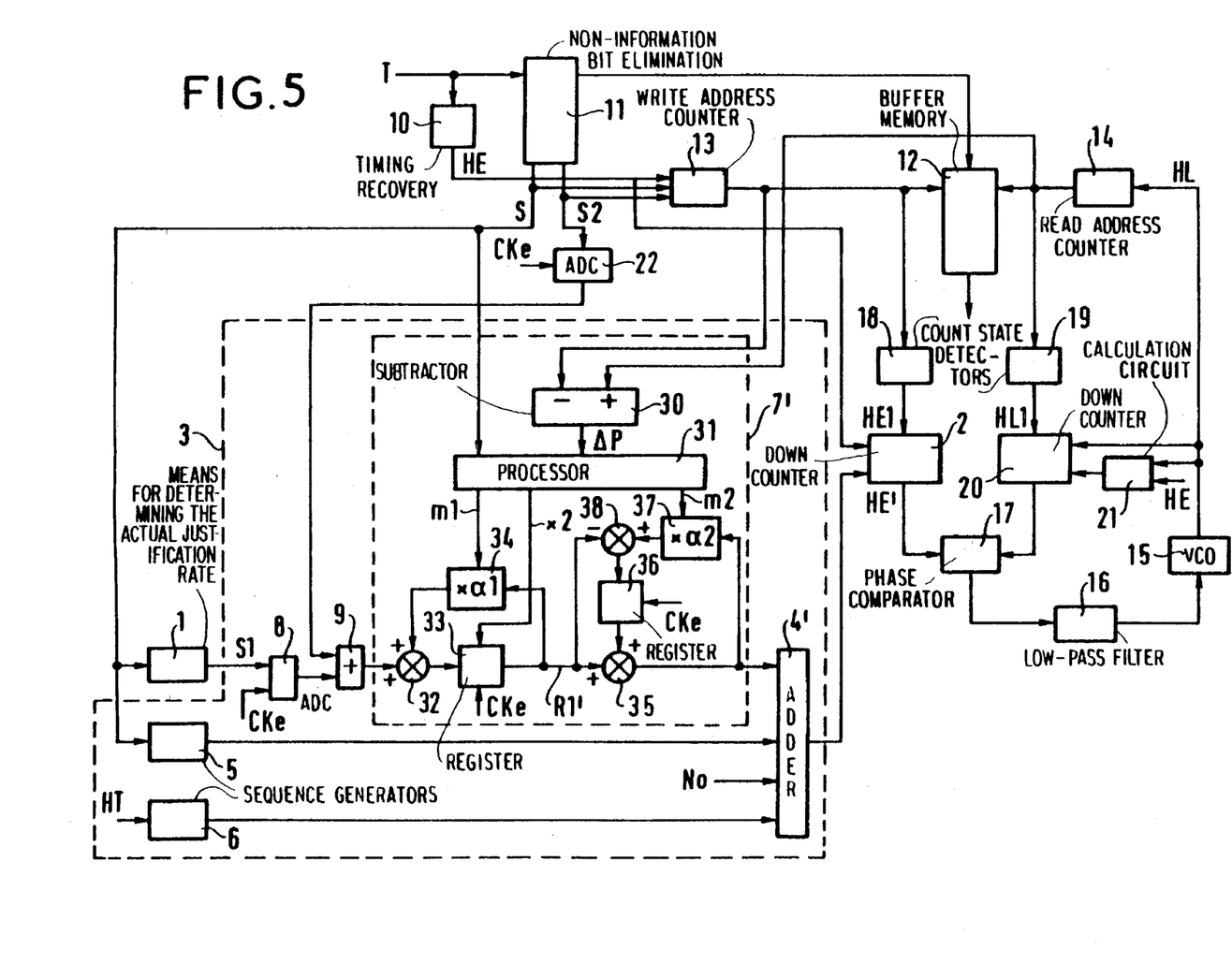
FIG. 5 is a block diagram of an alternative embodiment of the device of the invention.

FIG. 5 shows the block diagram of a variant of the embodiment shown in FIG. 3. Only the filter 7' is modified.

Rather than being a fixed bandwidth high-pass filter, it has a bandwidth which varies according to how full the buffer memory 12 is. It bandwidth can assume four different values, for example.

In the embodiment shown the filter 7' includes:

a subtractor 30 having two inputs respectively connected to the outputs of the write addressing and read addressing pointers 13, 14;

a processor 31 having an input connected to the output of the subtractor 30 to receive a value ΔP which is the difference between the current write address and the current read address of the buffer memory 12 and an input receiving the positive or negative justification indication signal S;

an adder 32 having first and second inputs and an output, its first input constituting the input of the filter 7' which is connected to the output of the adder 9;

a multiplier 34 having an input connected to an output of the processor 31 to receive a parameter value m1 and an output connected to the second input of the adder 32;

a register 33 having a data input connected to the output of the adder 32, a clock input receiving the clock signal CKe, a shift control input connected to an output of the processor 31 and an output connected to an input of the multiplier 34;

an adder 35 having first and second inputs and an output, its first input being connected to the output of the register 33 and its output constituting the output of the filter 7' which is connected to an input of the adder 4';

a multiplier 37 having an input connected to the output of the adder 35, an input connected to an output of the processor 31 supplying a parameter value m2 and an output;

a subtractor 38 having a "−" input connected to the output of the register 33 and a "+" input connected to the output of the multiplier 37; and a register 36 having an input connected to an output of the subtractor 38 and an output connected to the second input of the adder 35.

The multiplier 34 multiplies the value supplied by the output register 33 by a coefficient $\alpha 1 = 1 - \frac{1}{2}^{m1}$.

The multiplier 37 multiplies the value supplied by the output of the adder 35 by a coefficient $\alpha 2 = 1 - \frac{1}{2}^{m2}$.

For m1=m2=16, jitter is filtered at frequencies down to 0.05 Hz. To enable the filter to react faster to a transient the processor 31 compares the value ΔP representing the filling of the buffer memory 12 to three predetermined threshold values S1, S2, S3 (S1<S2<S3). The processor 31 supplies the following parameter values m1, m2:

| m1 | m2 | ΔP |
|----|----|----|
| 16 | 16 | if ΔP < S1 |
| 14 | 13 | if S1 ≦ ΔP < S2 |
| 12 | 11 | if S2 ≦ ΔP < S3 |
| 11 | 10 | if S3 ≦ ΔP |

On a transient the value ΔP crosses the successive threshold values S1, S2, S3. The processor 31 immediately switches the values m1 and m2 when the threshold values are crossed.

The values m1=11 and m2=10 procure a sufficiently large bandwidth of the justification device for a transient not to cause overflow from the buffer memory 12, which in this example has a capacity of 128 half-bytes.

In a preferred embodiment of the invention the processor 31 decrements only one of the parameters m1 and m2 at a time. For example, it modifies the values m1 and m2 as shown in the table below, in which S'1, ..., S'6 are predetermined threshold values increasing from S'1 through S'6.

| m1 | m2 | ΔP |
|----|----|----|
| 16 | 16 | ΔP < S1' |
| 14 | 16 | S1' ≦ ΔP < S2' |
| 14 | 13 | S2' ≦ ΔP < S3' |
| 12 | 13 | S3' ≦ ΔP < S4' |
| 12 | 11 | S4' ≦ ΔP < S5' |
| 11 | 11 | S5' ≦ ΔP < S6' |
| 11 | 10 | S6' ≦ ΔP |

The method whereby the parameter values m1 and m2 are changed alternately minimizes phase jitter due to changing the characteristics of the filter 7'. In the case of a high amplitude transient the difference ΔP crosses more than one threshold value very quickly and the processor 31 skips several values of m1 and m2.

In a preferred embodiment of the invention each time that the processor 31 reduces the value of the parameter m1 by k units (where k is an integer), it simultaneously commands a shift in the register 33 in order to divide the content of this register by $2^k$. The effect of this is instantaneously to divide by $2^k$ the value R1 supplied by this first stage of the filter and thus to reduce the time required for the value R1 obtained at the output of the first stage of the filter to stabilize. It can be shown that this value is proportional to $2^{m1}$. If m1 is incremented by one unit the value supplied by this first stage tends asymptotically to a value which is doubled. Dividing by $2^k$ the value supplied by the output of the first stage moves the value supplied much closer to its final value. The value supplied therefore reaches the final value corresponding to the new value of m1 faster.

Figure 6:
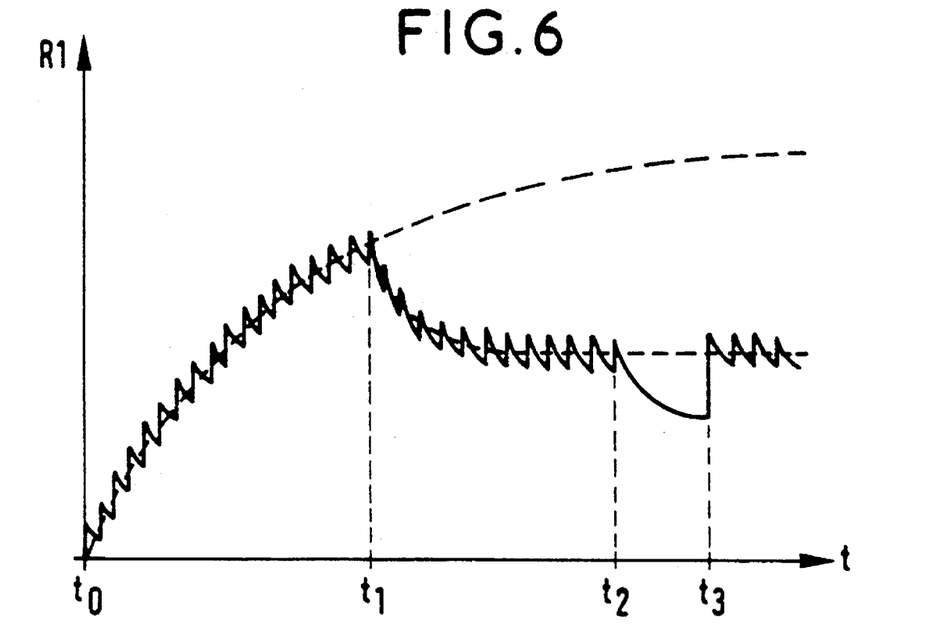
FIGS. 6 through 9 are four graphs illustrating the operation of this embodiment of the invention.
Figure 7:
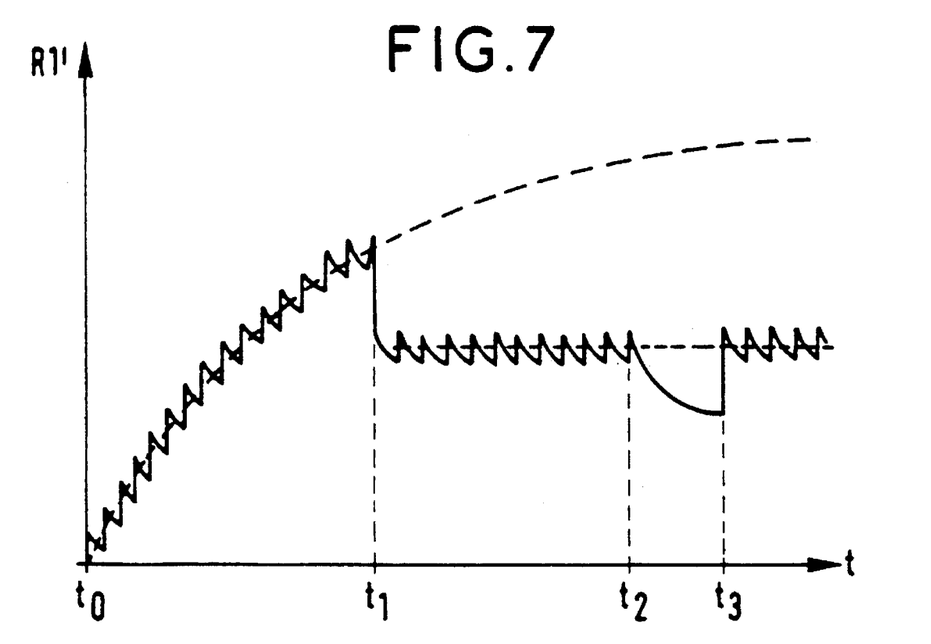

FIGS. 6 and 7 show the operation of the first stage 32, 33, 34 of the filter 7' in this embodiment at the time of a transient.

FIG. 6 is a graph showing the value R1 supplied at the output of the first stage in the case where the parameter m1 is decremented without halving the value supplied by the value of the first stage. FIG. 7 is a graph showing the value R1' supplied by the output of the first stage if the value R1' is divided by two by means of a shift in the register 33 at the time the value m1 is decremented.

At time $t_0$ a sequence of 87 positive or negative justifications begins, each justification corresponding to a sawtooth having a virtually infinite positive slope segment and an exponentially decreasing negative slope segment. At time $t_1$ the value m1 is incremented by one unit. During the time interval $t_0$ $t_1$ the envelope of the graph of R1 has an increasing exponential shape with a time constant which is the same in both figures.

In the situation shown in FIG. 6, at time $t_1$ the processor 31 detects that the difference ΔP has become greater than a threshold value. The processor 31 reduces the value m1 by one unit to increase the bandwidth of the filter 7'. The time constant is therefore reduced. The graph of R1 then tends asymptotically towards the same final value resulting from the change to m1, but with a steeper slope. In the situation shown in FIG. 7 the division by two causes a sudden reduction in the value R1' supplied by the first stage to a value very close to the final value (to within a few percent of the latter). The value R1' supplied by the first stage therefore stabilizes faster, which reduces the phase jitter caused by changing the value m1.

FIGS. 6 and 7 also show the variation of the value supplied by the first stage, respectively the value R1 and the value R1', between times $t_2$ and $t_3$ between which there is no justification. This absence of justification causes a reduction in the values R1 and R1'. This stops at the start of a new justification sequence.

The processor 31 decrements the parameters m1 and m2 in phase with the justification indication signal S in order to reduce the error due to division achieved by a shift in the register 33.

After the transient event which has increased the filling of the memory 12, the processor 31 detects that the value $\Delta P$ has fallen below the highest threshold value reached during the transient. It starts a timer. When it determines that the event has lasted a time period $T_0$, it changes the values of the parameters m1 and m2 in a predetermined sequence which is time-dependent only: every $T_1$ seconds it increments the value of m1 by one unit and then increments the value of m2 by one unit with an initial offset of $T_1/2$, and thereafter at regular intervals of $T_1$ seconds, in order to revert to the initial value m1=16 and m2=16 in order to reduce the bandwidth of the filter 7'. The offset between incrementing of m1 and m2 reduces the phase jitter produced by changing the filter characteristic, corresponding to each change of value of m1 or m2.

To minimize the phase jitter caused by changing the parameter value, m1 and m2 are incremented in steps of one unit.

When the value of m1 is incremented by one unit, the processor 31 commands the register 33 to effect a shift to multiply by two the value R1' supplied at the output of the first stage of the filter.

Figure 8:
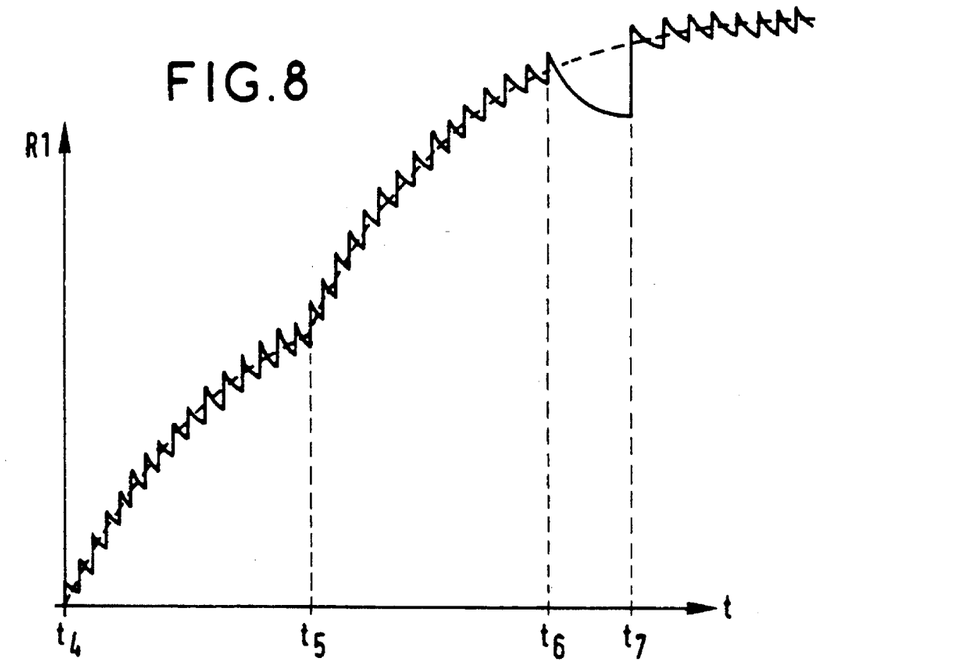

FIG. 8 is a graph showing the value R1 provided at the output of the first stage 32, 33, 34 of the filter 7' during the return to the stable state, with no shifting in the register 33. A sequence of 87 positive or negative justifications starts at time $t_4$. At time $t_5$ the value m1 is decremented by one unit. During the time interval $t_4 t_5$ the envelope of the graph of R1 has an increasing exponential shape with a certain time constant. After time $t_5$ it has a decreasing exponential shape with a steeper slope. The graph then tends asymptotically towards the same final value but more steeply.

Figure 9:
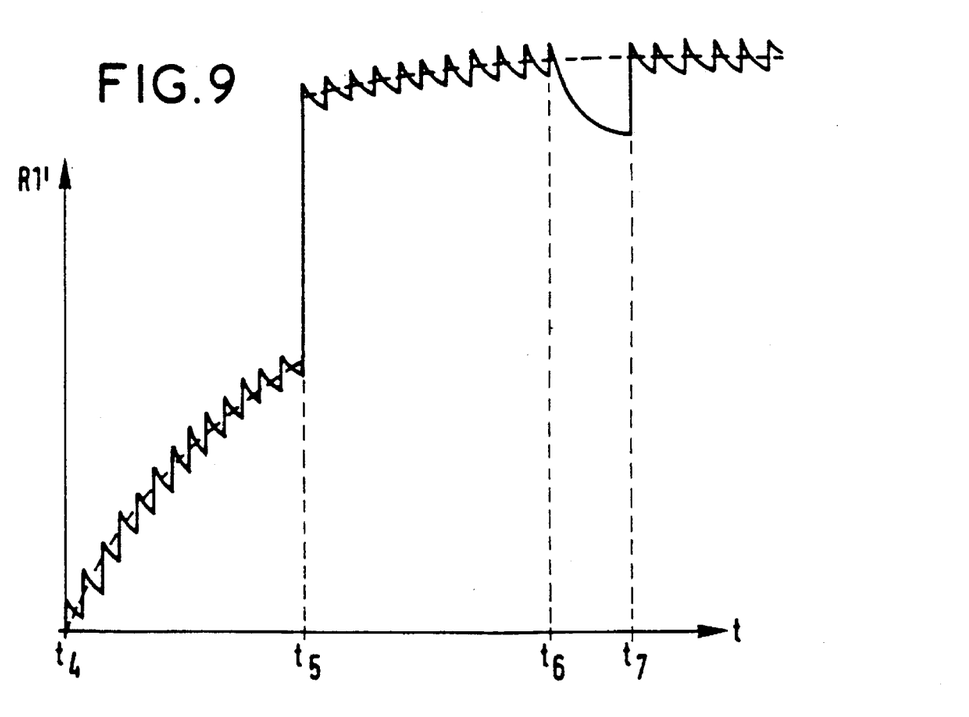

FIG. 9 is a graph showing the value R'1 supplied at the output of the first stage 32, 33, 34 of the filter 7' during this return to the stable state but with a one-bit shift in the register 33. This multiplication by two increases the value R1' supplied by the first stage to a value very close to the final value (to within a few percent of the latter). The value R1' supplied by the first stage therefore stabilizes faster, which reduces the phase jitter caused by changing the value of m1.

FIGS. 8 and 9 also show the variation of the value supplied by the first stage, respectively the value R1 and the value R1', between the times $t_6$ and $t_7$ between which there is no justification. This absence of justification causes a temporary reduction in the values R1 and R1'.

The processor 31 increments the parameter m1 in phase with the arrival of the justification indication signal S in order to minimize calculation errors during the multiplication effected by means of a shift in the register 33. This synchronization enables use for this multiplication of a value as close as possible to the final value.

For the same reason, before incrementing the parameter m1 or m2, the processor 31 verifies that there has been no gap in the series of justifications which has occurred during the time-delay $T_0$. This verification must not prevent the possibility of incrementing the parameters m1 and m2 during a long period with no justification and in which there would be a risk of the buffer memory saturating or drying out.

To implement this safety measure the processor 31 compares the value $\Delta P$ continuously with a high threshold value and a low threshold value and instigates the decrementing of the parameters m1 and m2 immediately if either threshold value is crossed. The high threshold value is set at a value greater than S'6 and the low threshold value is set at a value less than S'0 in this example.

To prevent the filter bandwidth remaining at the increased value the processor 31 starts a time-delay on the arrival of each justification signal S. If this signal disappears during a fixed time T2 and if no threshold is crossed during this time the processor 31 starts the sequence of changes to m1 and m2 to return the filter to its initial state.

There is claimed:

1. A device for filtering positive dejustification jitter of a dejustified digital bit stream, said device comprising:

a buffer memory into which said dejustified digital bit stream is written at a write timing rate and then is read out of said buffer memory at a read timing rate;

a phase-locked loop for slaving the timing of a signal representative of the read timing rate to the timing of a signal representative of the write timing rate whilst applying low-pass filtering;

a first circuit which determines an actual justification rate of said digital bit stream and deduces therefrom a difference justification rate Td equal to the difference between said actual justification rate and a nominal justification rate Tn of said digital bit stream; and a second circuit which:

systematically eliminates first phase shifts due to positive dejustification from said signal representative of said buffer memory write timing rate, regenerates negative second phase shifts of said signal representative of said buffer memory write timing rate in numbers corresponding to said nominal justification rate, regenerates negative third phase shifts of said signal representative of said buffer memory write timing rate in numbers corresponding to said difference justification rate, and smoothes said second and third phase shifts.

2. A device according to claim 1, wherein said second circuit includes:

a device which applies to said signal representative of said buffer memory write timing rate a time-delay;

a device which determines values of said time delay by superposing:

a sequence generated by a generator of values −N where N is a positive number denoting the amplitude of said phase shifts, the values of said sequence being generating so that they are applied coincidentally with the pulses of said signal, representative of said buffer memory write timing rate, which are affected by said second and third phase shifts, a sequence generated by a generator of values +N, the number of values in said sequence in each period 1/F being Tn·A, where F is the frequency at which said actual justification rate and said difference justification rate are determined and A is the maximum number of phase shifts in a period 1/F, sequences generated by a first digital filter of values varying progressively from 0 to Td·A·N (where Td is positive or negative), each of said sequences being generated if a non-null difference justification rate is determined, and a nominal value No determined so that the value resulting from said superposition does not become negative in the case of consecutive negative values Td; and a device which applies to the pulses of said signal representative of said buffer memory read timing rate a constant time-delay Mo such that Mo×TL=No×TE where TL and TE are respectively the period of the read timing rate signal and the period of the write timing rate signal of said buffer memory.

3. A device according to claim 2, wherein said device which determines said values of said time-delay comprises:

a second digital filter which receives a positive-negative justification indication signal after it is converted to digital form and said first and second digital filters comprise a single digital filter which receives a signal from an adder receiving a difference justification rate indication signal in digital form, and said positive-negative justification indication signal after it is converted to digital form; and a device which superposes on said sequences a sequence of values +Td·A·N, each value of said sequence being generated if a non-null difference justification rate is determined.

4. A device according to claim 1, wherein said signal representative of said buffer memory write timing rate is a series of pulses, and further comprising:

a time-delay device which applies to the pulses of said signal representative of said buffer memory write timing rate a time-delay which in the presence of a phase shift due to positive-negative dejustification becomes instantaneously, for the pulse of said signal representative of said buffer memory write timing rate which is affected by said phase shift, equal to +N' or to −N' according to whether said phase shift has an amplitude equal to −N' or an amplitude equal to +N', where N' is a positive number, and then for a series of subsequent pulses, varies progressively from +N' to 0 from −N' to 0, respectively; and a device controlled by a positive-negative justification indication signal to determine values of the time-delay to be applied by said time-delay device.

5. A device according to claim 4, wherein said device which determines said values of said time-delay includes a digital filter which receives said positive-negative justification indication signal after it is converted to digital form.

6. A device according to claim 4, wherein said single digital filter is a high-pass filter of variable bandwidth whose bandwidth is determined by a value of at least one parameter, and further comprising which determines the value of each said parameter according to how full said buffer memory is, so that the bandwidth of said filter is increased as the filling of said buffer memory increases.

7. A device according to claim 6, wherein said device which determines the value of said at least one parameter modifies the value of at least one parameter in a direction to increase the bandwidth if and only if the filling of said buffer memory becomes greater than a predetermined threshold value and synchronously with the justification in order to modify the value just before said justification; and modifies the value of said at least one parameter in a direction to reduce the bandwidth:
if the filling becomes less than said predetermined threshold value for a predetermined time; and
if there is a series of justifications without interruption during said predetermined time.

8. A device according to claim 6, wherein the bandwidth of said single filter is determined by at least two parameters and said device which determines the value of each filter parameter compares the filling value with a plurality of separate fixed threshold values and modify only one parameter at a time if the filling becomes respectively greater than or less than one of said fixed threshold values.

9. A device according to claim 6, wherein said single filter includes at least a first and a second stage, the first stage supplying a final value which is multiplied or respectively divided by two if a value of a parameter is increased or respectively decreased by one unit, and said first stage further includes a device which multiplies or respectively divides by $2^k$ the final value supplied by said first stage and a controller which controls said device which multiplies or respectively divides if said device which determines the value of each parameter determine for said first stage a parameter modification equal to +k or respectively −k where K is a non-zero integer.

10. A device for filtering positive dejustification jitter of a dejustified digital bit stream, said device comprising:

a buffer memory into which said dejustified digital bit stream is written at a write timing rate and then is read out of said buffer memory at a read timing rate;

a phase-locked loop for slaving the timing of a signal representative of the read timing rate to the timing of a signal representative of the write timing rate whilst applying low-pass filtering;

a first circuit which determines an actual justification rate of said digital bit stream and deduces therefrom a difference justification rate Td equal to the difference between said actual justification rate and a nominal justification rate Tn of said digital bit stream; and a second circuit which:
systematically eliminates first phase shifts due to positive dejustification from said signal representative of said buffer memory write timing rate,
regenerates second phase shifts of said signal representative of said buffer memory write timing rate in numbers corresponding to said nominal justification rate,
regenerates third phase shifts of said signal representative of said buffer memory write timing rate in numbers corresponding to said difference justification rate, and
smoothes said second and third phase shifts;

said second circuit including:
a device which applies to said signal representative of said buffer memory write timing rate a time-delay;
a device which determines values of said time delay by superposing;
a sequence generated by a generator a values −N where N is a positive number denoting the amplitude of said phase shifts, the values of said sequence being generating so that they are applied coincidentally with the pulses of said signal, representative of said buffer memory write timing rate, which are affected by said second and third phase shifts,
a sequence generated by a generator of values +N, the number of values in said sequence in each period 1/F being Tn·A, where F is the frequency at which said actual justification rate and said difference justification rate are determined and A is the maximum number of phase shifts in a period 1/F,
sequences generated by a first digital filter of values varying progressively from 0 to Td·A·N (where Td is positive or negative), each of said sequences being generated if a non-null difference justification rate is determined, and a nominal value No determined so that the value resulting from said superposition does not become negative in the case of consecutive negative values Td; and a device which applies to the pulses of said signal representative of said buffer memory read timing rate a constant time-delay Mo such Mo×TL–No×TE where TL and Te are respectively the period of the read timing rate signal and the period of the write timing rate signal of said buffer memory.

11. A device according to claim 10, wherein said device which determines said values of said time-delay comprises:

a second digital filter which receives a positive-negative justification indication signal after it is converted to digital form and said first and second digital filters comprise a single digital filter which receives a signal from an adder receiving a difference justification rate indication signal in digital form, and said positive-negative justification indication signal after it is converted to digital form; and a device which superposes on said sequences a sequence of values +Td·A·N, each value of said sequence being generated if a non-null difference justification rate is determined.

12. A device for filtering positive dejustification jitter of a dejustified digital bit stream, said device comprising:

a buffer memory into which said dejustified digital bit stream is written at a write timing rate and then is read out of said buffer memory at a read timing rate;

a phase-locked loop for slaving the timing of a signal representative of the read timing rate to the timing of a signal representative of the write timing rate whilst applying low-pass filtering, said signal representative of said write timing rate being a series of pulses;

a first circuit which determines an actual justification rate of said digital bit stream and deduces therefrom a difference justification rate Td equal to the difference between said actual justification rate an a nominal justification rate Tn of said digital bit stream;

a second circuit which:
  systematically eliminates first phase shifts due to positive dejustification from said signal representative of said buffer memory write timing rate,
  regenerates second phase shifts of said signal representative of said buffer memory write timing rate in numbers corresponding to said nominal justification rate,
  regenerates third phase shifts of said signal representative of said buffer memory write timing rate in numbers corresponding to said difference justification rate, and
  smoothes said second and third phase shifts;

a time-delay device which applies to the pulses of said signal representative of said buffer memory write timing rate a time-delay which in the presence of a phase shift due to positive-negative dejustification becomes instantaneously, for the pulse of said signal representative of said buffer memory write timing rate which is affected by said phase shift, equal to +N' or to –N' according to whether said phase shift has an amplitude equal to –N' or an amplitude equal to +N' where N' is a positive number, and then for a series of subsequent pulses, varies progressively from +N' to 0 or from –N' to 0, respectively; and a device controlled by a positive-negative justification indication signal to determine values of the time-delay to be applied by said time-delay device.

13. A device according to claim 12, wherein said device which determines said values of said time-delay includes a digital filter which receives said positive-negative justification indication signal after it is converted to digital form.

14. A device according to claim 13, wherein said single digital filter is a high-pass filter of variable bandwidth whose bandwidth is determined by a value of at least one parameter, and further comprising which determines the value of each said parameter according to how full said buffer memory is, so that the bandwidth of said filter is increased as the filling of said buffer memory increases.

15. A device according to claim 14, wherein said device which determines the value of said at least one parameter modifies the value of at least one parameter in a direction to increase the bandwidth if and only if the filling of said buffer memory becomes greater than a predetermined threshold value and synchronously with the justification in order to modify the value just before said justification; and modifies the value of said at least one parameter in a direction to reduce the bandwidth:
    if the filling becomes less than said predetermined threshold value for a predetermined time; and
    if there is a series of justifications without interruption during said predetermined time.

16. A device according to claim 14, wherein the bandwidth of said single filter is determined by at least two parameters and said device which determines the value of each filter parameter compares the filling value with a plurality of separate fixed threshold values and modify only one parameter at a time if the filling becomes respectively greater than or less than one of said fixed threshold values.

17. A device according to claim 14, wherein said single filter includes at least a first and a second stage, the first stage supplying a final value which is multiplied or respectively divided by two if a value of a parameter is increased or respectively decreased by one unit, and said first stage further includes a device which multiplies or respectively divides by $2^k$ the final value supplied by said first stage and a controller which controls said device which multiplies or respectively divides if said device which determines the value of each parameter determine for said first stage a parameter modification equal to +k or respectively –k where K is a non-zero integer.

* * * * *